US 6,725,724 B2

(12) United States Patent
Glück

(10) Patent No.: US 6,725,724 B2
(45) Date of Patent: Apr. 27, 2004

(54) MANUFACTURING METHOD FOR A THIN-FILM HIGH-PRESSURE SENSOR

(75) Inventor: Joachim Glück, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/911,644

(22) Filed: Jul. 20, 2001

(65) Prior Publication Data
US 2002/0050171 A1 May 2, 2002

(30) Foreign Application Priority Data
Jul. 26, 2000 (DE) ........................ 1 00 36 284

(51) Int. Cl.⁷ ................................................ G01L 7/08
(52) U.S. Cl. .................... 73/715; 73/718; 73/708; 73/724; 73/361; 73/283.1; 73/283.4
(58) Field of Search ............... 73/715–719, 146, 73/708, 724; 33/642; 438/53, 412; 600/537; 324/691; 361/283.1–283.4

(56) References Cited

U.S. PATENT DOCUMENTS

| 4,390,925 A | * | 6/1983 | Freud .................. 361/283.4 |
| 4,415,948 A | * | 11/1983 | Grantham et al. ........ 361/283.1 |
| 4,550,612 A | * | 11/1985 | Yamada et al. .............. 73/727 |
| 4,612,599 A | * | 9/1986 | Ziegler ................... 361/283.4 |
| 4,996,627 A | * | 2/1991 | Zias et al. ............... 361/283.4 |
| 5,635,649 A | * | 6/1997 | Tobita et al. ................ 73/717 |

FOREIGN PATENT DOCUMENTS

| DE | 4028376 | * | 3/1992 | ................ 324/691 |
| DE | 4028376 A1 | * | 3/1992 | ................ 324/691 |
| JP | 363222463 A | * | 9/1988 | |
| JP | 363222463 A | * | 9/1988 | .................. 438/53 |

OTHER PUBLICATIONS

Washington Technology Center, Anodic Bonding, www.microfab.watechcenter.org.*
MEMS Exchange,Anodic Bonding,www.mems-exchange.org.*
Fraunhofer, Anodic Bonding,www.pbizm.fhg.de.*
Donald M. Mattox, Vacuum Deposition Processes,www.pfonline.com.*

* cited by examiner

Primary Examiner—Stephen R. Funk
Assistant Examiner—Marissa Ferguson
(74) Attorney, Agent, or Firm—Kenyon & Kenyon

(57) ABSTRACT

A method for manufacturing a sensor component, in particular, a thin-film high-pressure sensor, as well as a sensor component, is described, in which at least one measuring element, in particular an expansion measuring strip is arranged on a membrane, and separated from the membrane through an electrically insulating film, the measuring element being arranged on an electrically insulating substrate, which is mounted in a subsequent step onto the membrane on the side that faces away from the measuring element, so that the electrically insulating substrate forms the electrically insulating film. The electrically insulating substrate performs both a carrier function during the application of the expansion measuring strip to the substrate as well as an insulation function after the mounting of the substrate onto the membrane. In this way, the application of a separate insulation film made of silicon dioxide becomes unnecessary.

23 Claims, 2 Drawing Sheets

MANUFACTURING METHOD FOR A THIN-FILM HIGH-PRESSURE SENSOR

BACKGROUND INFORMATION

The present invention relates to a manufacturing method for a sensor component and a sensor component, in particular a thin-film high-pressure sensor that has a substrate, on which at least one functional film that is to be provided with contacts is to be applied. High-pressure sensors of this type are used in numerous systems in the motor vehicle, for example, in direct gasoline injection. High-pressure sensors are also used in the field of automation technology. The function of these sensors is based on the conversion of the mechanical deformation of a membrane, which is brought about by the pressure, into an electric signal using a thin-film system. German Patent No. 100 14 984 describes thin-film systems of this type, having high-pressure sensors. They have a silicon dioxide film for the electric insulation of the functional film from the high-grade steel substrate. However, known manufacturing systems for semi-conductor methods are not prepared for the processing of high-grade steel substrates that are 5 millimeters thick and up to 850 grams in weight, for example.

SUMMARY OF THE INVENTION

The method according to the present invention and the sensor component according to the present invention have, in contrast, the advantage that an electric insulation of the measuring elements is ensured by the membrane, without having to apply insulating films, such as silicon dioxide films for example, separately onto the membrane. In this way, the processing can be performed using standard systems, since a material with a thickness of less than one millimeter, which is compatible with manufacturing systems that are currently available for semiconductor methods, can be used as an electrically insulating substrate. Thus, it is no longer necessary to adapt the production equipment for the application of the thin films to the use of high-grade steel membranes, for example. Furthermore, costs for the production equipment, which is necessary for the application of a silicon dioxide film that is several micrometers thick, can be avoided. Insulating substrates that are self-supporting are, in addition, easy to handle in the context of the application of the resistor, contact, and passivation films.

It is especially advantageous to use thin glass as an electrically insulating substrate, which ensures a good electric insulation in a cost-effective manner, is stable and thus easy to handle, and furthermore, can be attached to a membrane using anodic bonding. Other attachment methods such as, for example, adhesion, are also possible.

DETAILED DESCRIPTION

Figure 1A:
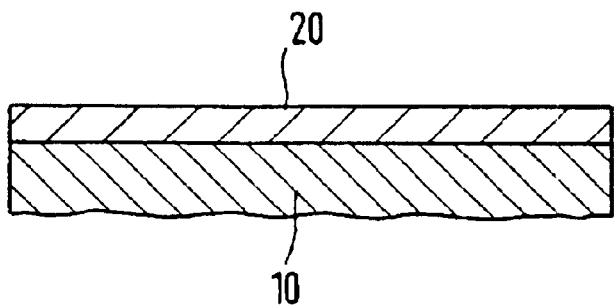
FIG. 1 shows a manufacturing method according to the related art.
Figure 1B:
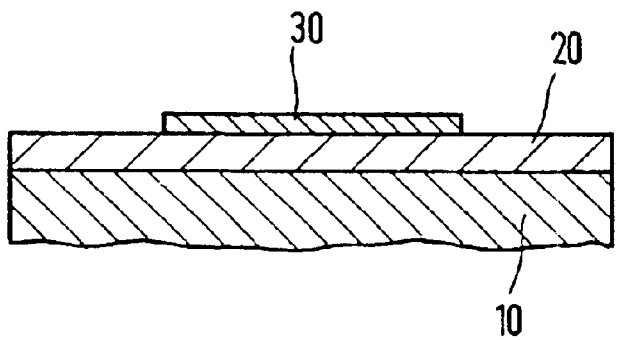
Figure 1C:
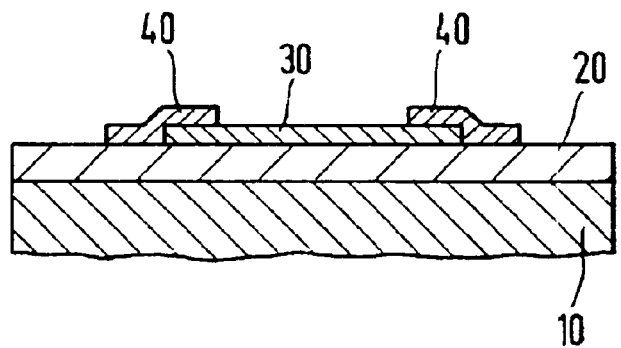
Figure 1D:
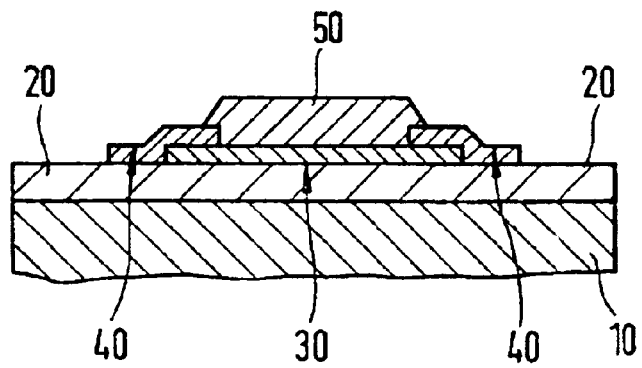

FIG. 1 shows a method described in German Patent No. 100 14 984 for manufacturing high-pressure sensors. At first (FIG. 1a), an insulation film 20 is applied onto the entire surface of a steel membrane 10 which is to be coated. Then, the actual functional film for expansion measuring strips is applied over the entire surface; these expansion measuring strips 30 are then produced in an additional step using a photolithographic structuring step (FIG. 1b). Following that, the contact film, i.e., contact film system 40, which is usually also photolithographically structured, is applied (FIG. 1c). Alternatively to the photolithographic structuring of contact film 40, the shadow masking technique is also used. To set the desired electric properties, a balancing process frequently follows, especially for the adjustment of the symmetry of a Wheatstone bridge formed by several piezo-resistive expansion measuring strips and/or structured resistance elements. In an additional step (FIG. 1d), a passivation film 50 is applied, the structuring of which is also done either photolithographically or by the use of the shadow masking technique.

Figure 2A:
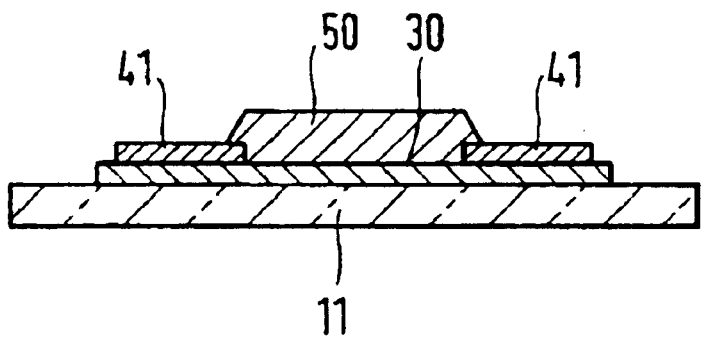
FIG. 2 shows a manufacturing method according to the present invention.
Figure 2B:
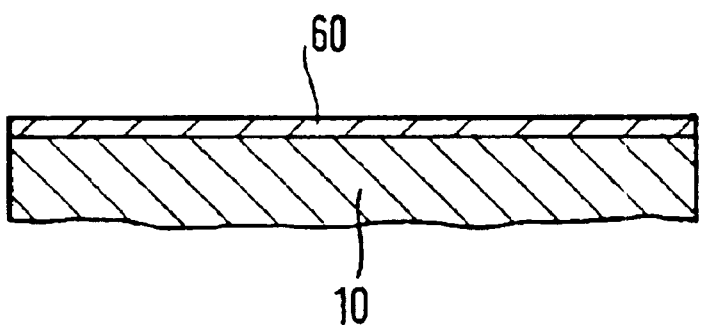
Figure 2C:
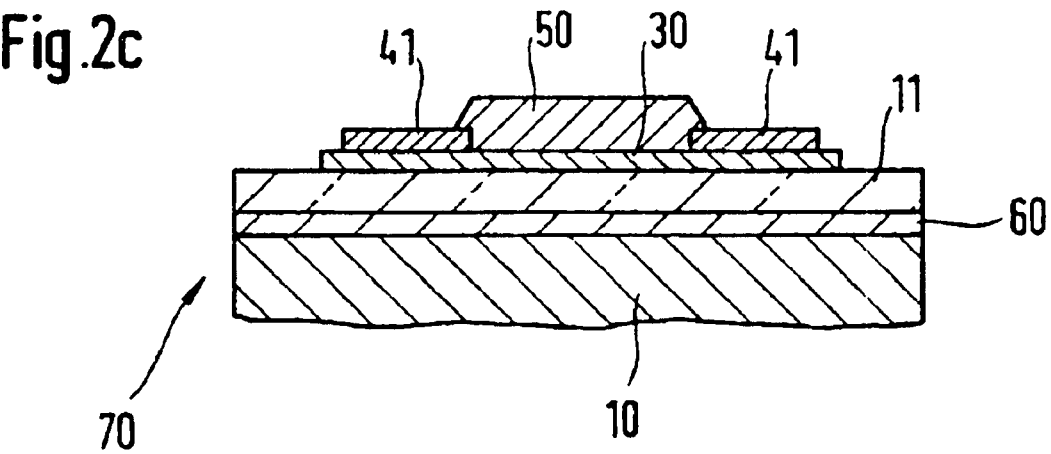

FIG. 2 shows a method according to the present invention for manufacturing a high-pressure sensor. At first, a Wheatstone bridge is created on a self-supporting thin glass 11, which, for example, has a thickness of 20 micrometers. The thin glass is, for example, a material having the trademark AF45 by Schott. Other borosilicate glass types that can be used are "Pyrex" by Corning or "Tempax" by Schott, for example. In a manner already explained in FIG. 1, the required four expansion measuring strips 30, which are provided with a contact film system 41 and covered with a passivation film 50 (FIG. 2a), are applied. As opposed to the method shown in FIG. 1, the contacts of the contact film system are applied exclusively onto the material of the expansion measuring strips. As a material for the expansion measuring strips, a 500 nanometer thick polysilicon film or a 50 nanometer thick nickel-chromium or nickel-chromium-silicon film is applied, which is structured via a photolithographic step and a subsequent plasma-etching step. The application of the 500 nanometer thick contact film system made of nickel or of a film sequence made of nickel-chromium, palladium, and then gold is done using sputtering or vapor deposition through a shadow mask. The deposition of a passivation film 50 made of silicon nitride is done in a PECVD process (PECVD: Plasma Enhanced Chemical Vapor Deposition). In another step, simultaneously with the production of the Wheatstone bridge, for example, steel membrane 10, for example a high-grade steel membrane, is covered with an amorphous or polycrystalline silicon film 60 on the side on which the arrangement shown in FIG. 2a is to be arranged later, in a chemical vapor deposition process (CVD process), in particular, in a LPCVD process (LPCVD=Low Pressure Chemical Vapor Deposition) or in a PECVD process, or using a sputtering process (FIG. 2b). (The glass substrate can also be bonded directly through anodic bonding to the high-grade steel substrate, in which case the silicon coating is rendered unnecessary). The pressure to be measured in the later use of the high-pressure sensor is then incident on the side of the steel membrane 10 that is opposite silicon film 60. After applying the silicon film, the thin glass, with its surface that faces away from the Wheatstone bridge, is applied onto the silicon film as shown in FIG. 2c, and subjected to an anodic bonding process, from which, in the end, anodically bonded sensor 70 results. The anodic bonding process produces an irreversible, chemically stable connection between the metal, the silicon film and the thin glass. For this purpose, the high-grade steel substrate is placed on a heating surface (temperature: 300 to 500° C.) and a DC voltage of between 100 and 1000 volts is applied between the heating plate as the anode and a cathode that contacts the glass. A chemical reaction that is started produces the irreversible bond.

The described manufacturing of the Wheatstone bridge thus does not occur on a high-grade steel substrate that is covered with an insulation film made of silicon dioxide that is 10 micrometers thick, for example, but instead it occurs on a 10 to 20 micrometer thick thin glass substrate. Only subsequently are the high-grade steel membrane 10 and the resistor bridge connected by anodic bonding. In this way, the thin glass subsequently also takes on the role of, along with the function of supporting the resistor elements during their application to the substrate, the electric insulation of these elements from the electrically conducting steel substrate. The 10 micrometer substrate insulation made of silicon dioxide can thus be rendered completely unnecessary.

Alternatively, a structure with the previously known contact film system 40 can also be applied onto the thin glass substrate. The subsequent procedure of preparation of the high-grade steel substrate and the anodic bonding remains unaffected by the specific design of the measuring arrangement.

Alternatively, structuring of the resistor film with a laser procedure can also occur, as described in German Patent No. 100 14 984.

In order to increase the productivity and for the optimal utilization of the manufacturing systems, a glass substrate with the same shape as a six- or eight-inch silicon wafer can also be used as the thin glass. A glass substrate of this type is covered over the entire surface with up to approximately 200 Wheatstone bridges. The resistor bridges mounted on the glass substrate are preferably bonded to a corresponding number of high-grade steel substrates at the same time. Separation then takes place with the help of a laser, which divides up the glass substrate.

It is also possible to divide up the glass substrate prior to anodic bonding using a laser, and after that, to bond the individual resistor bridges onto the high-grade steel substrate separately.

To increase the mechanical stability of the thin glass, processing can occur on a suitable carrier (for example, on a silicon wafer). In this method, the glass substrate is laminated onto the wafer, for example. Lamination is done by pressing the thin glass coated with an adhesive substance onto the silicon wafer. Only when the thin glass is to be bonded onto the high-grade steel substrate is it then removed from this carrier; by immersing the glass-wafer composite in a solvent, the solvent dissolves the adhesive.

What is claimed is:

1. A sensor component comprising:
   a membrane arrangement including a steel substrate;
   at least one measuring element; and
   a thin glass separating the at least one measuring element from the membrane, the thin glass having a first side on which the at least one measuring element is situated, the thin glass further having a second side to which the membrane is attached, the first side being opposite to the second side, the thin glass forming an electrically insulating film;
   wherein the thin glass is anodically bonded to the membrane arrangement.

2. The sensor component according to claim 1, wherein the sensor component is a thin-film high-pressure sensor.

3. The sensor component according to claim 1, wherein the at least one measuring element includes an expansion measuring strip.

4. The sensor component according to claim 1, wherein the membrane has a surface on a side of the membrane facing the thin glass, the surface being covered with one of an amorphous and a polycrystalline silicon film.

5. The sensor component according to claim 1, wherein the steel substrate is a high-grade steel substrate.

6. The sensor component according to claim 1, wherein the at least one measuring element includes a Wheatstone bridge.

7. The sensor component according to claim 6, wherein the Wheatstone bridge is formed by piezo-resistive expansion measuring strips.

8. The sensor component according to claim 6, wherein the Wheatstone bridge is formed by structured resistance elements.

9. The sensor component according to claim 1, wherein the thin glass is a borosilicate glass.

10. The sensor component according to claim 1, wherein the measuring element includes an expansion measuring strip formed from a polysilicon film.

11. The sensor component according to claim 1, wherein the measuring element includes an expansion measuring strip formed from a nickel-chromium film.

12. The sensor component according to claim 11, wherein the nickel-chromium film includes a nickel-chromium-silicon film.

13. The sensor component according to claim 1, wherein the thin glass is 10 to 20 micrometers thick.

14. The sensor component according to claim 1, wherein the measuring element includes an expansion measuring strip that is provided with a contact film system.

15. The sensor component according to claim 14, wherein the contact film system is 500 nanometers thick.

16. The sensor component according to claim 14, wherein the contact film system is made of nickel.

17. The sensor component according to claim 16, wherein the contact film system is 500 nanometers thick.

18. The sensor component according to claim 14, wherein the contact film system is a film sequence of nickel-chromium, palladium, and gold.

19. The sensor component according to claim 18, wherein the contact film system is 500 nanometers thick.

20. The sensor component according to claim 1, wherein the thin glass is self-supporting.

21. The sensor component according to claim 1, wherein the thin glass is anodically bonded directly to the steel substrate.

22. The sensor component according to claim 1, wherein the membrane arrangement includes a silicon film on the steel substrate, and the thin glass is anodically bonded to the silicon film to provide a connection between the steel substrate, the silicon film and the thin glass.

23. A sensor component comprising:
   a membrane arrangement including a steel substrate;
   at least one measuring arrangement; and
   a self-supporting thin glass separating the at least one measuring arrangement from the membrane, the thin glass having a first side on which the at least one measuring arrangement is situated, the thin glass further having a second side to which the membrane arrangement is attached, the first side being opposite to the second side, the thin glass electrically insulating the at least one measuring arrangement from the membrane arrangement;
   wherein:
      the thin glass is anodically bonded to the membrane arrangement,
      the steel substrate is a high-grade steel substrate,
      the thin glass is a borosilicate glass,
      the thin glass is 10 to 20 micrometers thick, and
      the measuring element includes an expansion measuring strip that is provided with a contact film system and covered with a passivation film.

* * * * *